Fig.1

Jan. 27, 1953 W. F. CAHOON 2,626,640
PNEUMATICALLY OPERATED SAWMILL DOG
Filed Aug. 8, 1949 7 Sheets-Sheet 3

INVENTOR.
WILLIAM F. CAHOON
BY
Jennings & Carter
ATTORNEYS

Jan. 27, 1953　　　W. F. CAHOON　　　2,626,640
PNEUMATICALLY OPERATED SAWMILL DOG
Filed Aug. 8, 1949　　　7 Sheets-Sheet 4

INVENTOR.
WILLIAM F. CAHOON
BY
Jennings & Carter
ATTORNEYS

Jan. 27, 1953 W. F. CAHOON 2,626,640
PNEUMATICALLY OPERATED SAWMILL DOG
Filed Aug. 8, 1949 7 Sheets-Sheet 6

INVENTOR.
WILLIAM F. CAHOON
BY
Jennings & Carter
ATTORNEYS

Jan. 27, 1953 W. F. CAHOON 2,626,640
PNEUMATICALLY OPERATED SAWMILL DOG
Filed Aug. 8, 1949 7 Sheets-Sheet 7

INVENTOR.
WILLIAM F. CAHOON
BY
Jennings & Carter
ATTORNEYS

Patented Jan. 27, 1953

2,626,640

UNITED STATES PATENT OFFICE 2,626,640

PNEUMATICALLY OPERATED SAWMILL DOG

William F. Cahoon, Birmingham, Ala., assignor, by decree of distribution, to Una Thomas Cahoon Application August 8, 1949, Serial No. 109,131

10 Claims. (Cl. 143—125)

This invention relates to that type of log and lumber dogging apparatus which is operative by fluid pressure and has for one of its objects the provision of apparatus of the character designated which shall be so constructed that the weight of all the dogging mechanism, except the guide for the dog bar cases and its supporting members is transferred to the center of the head block and in which the dog cases, dogs, and dog movement cylinders are disposed on the outside of the knee, affording accessibility and ease of maintenance.

My invention contemplates apparatus in which the upper dog case, with its dogs, is raised to dogging position by an upward thrust of the piston of an air operated cylinder, with the piston rod attached to a cross head and to the upper dog case. When dogging pressure is exerted on the top of the piston, bringing the upper dog down upon the timber and at rest, the pressure continues on the upper cylinder head causing it to raise, bringing with it the lower dog case, which is attached to the cylinder by a suitable connection. The cylinder in its upward movement is guided by guide rods which are secured to the supporting base of the cylinder and which fit slidingly into sleeves operatively connected to the cylinder.

A further object of my invention is to provide pneumatically operated apparatus for log and lumber dogs in which the air cylinders are mounted between the two sides of the knee, with the cylinders movably supported on a suitable base between the knees, and with improved guiding mechanism which prevents contact of the cylinders with the side walls of the knee and transfers the weight to the center of the head block.

Still another object of my invention is to provide pneumatically operated apparatus for operating the dogs in a sawmill which shall include an improved cylinder construction together with improved means for admitting air pressure to the underside of the piston in the cylinder.

A still further object of my invention is to provide pneumatically operated apparatus for the dogs in a sawmill which shall include a lower dog case, with improved means for supporting and actuating it, whereby it is prevented from cocking or binding on the dog case guide bar, together with means for adjusting the height of the lower dog case to compensate for wear and compression of the cylinder cushions which I employ.

A still further object of my invention is to provide dogging apparatus together with improved means for mounting and moving the dogs inwardly and outwardly of the dog case, together with improved means for compensating for wear between the dog case and the dog case guide bar.

Still another feature of my invention is the provision of an improved means for warning the operator whenever the lower dog approaches an unsafe limit of travel forwardly of the dog case.

Apparatus embodying features of my invention is illustrated in the accompanying drawings, forming a part of this application, in which.

Referring now to the drawings for a better understanding of my invention, I show a fragment 10 of a head block on which is mounted a hollow knee 11, the knee being movable on the head block, forwardly and rearwardly, in a manner well understood and which needs no description.

The knee consists of two side plates 12 and 13 which are joined together at the front by a face plate 14 and at the rear by a cross member 16. A cylinder support or base plate 17 extends across between the side plates 12 and 13, and is joined to both of said plates by welding or otherwise.

Attached to the side plate 13 of the knee is a bracket 18 having an upper arm 19 and a lower arm 21, to which is secured a dog case guide bar 22 which extends from the top to bottom of the knee.

Figure 4:
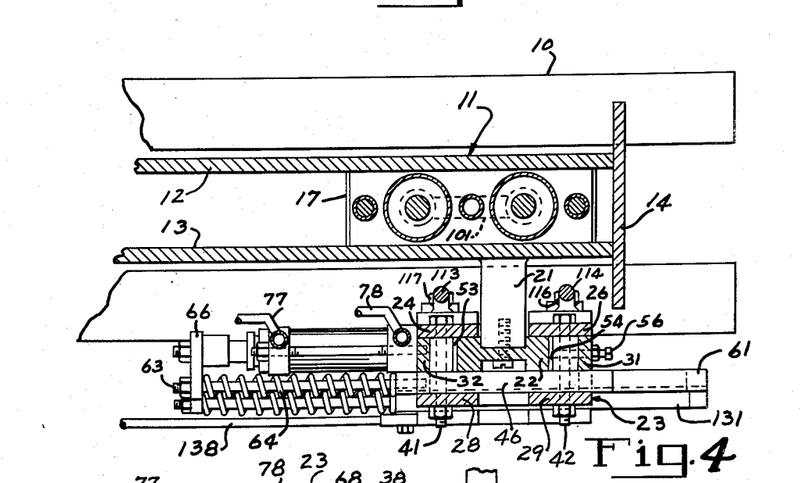
Fig. 4 is a sectional view taken along the line IV—IV of Fig. 1.

Mounted on, and vertically movable with respect to the guide bar, is an upper dog case 23. The dog case is comprised of two inner side plates 24 and 26 which are spaced apart to straddle the arms 19 and 21, and permit vertical movement of the case. The plates 24 and 26 are joined together at the top by an operating bracket 27. The outer side of the upper dog case is comprised of two flat spaced bars 28 and 29 and the front and rear by flat bars 31 and 32. The front and rear bars 31 and 32 are joined to the inner bars 24 and 26 by welding and the inner and outer bars are joined together by a suitable number of bolts 33, 34, 36 and 37 which support dog bar guides 38 and 39. They are also joined together by bolts 41, 42, 43, and 44, which support the intermediate dog bar guides 46 and 47. As shown in Fig. 4 of the drawing, the dog bar guides are positioned outside, or beyond, the dog case guide bar 22 and thereby do not interfere with the vertical movement of the dog case on the guide bar 22. Mounted within the dog case 23 between the end members 31 and 32, and bearing against the dog case guide bar 22, are gibs 48 and 49. Similar gibs 53 and 54 are mounted alongside the intermediate dog bar guides 46 and 47. Each of the gibs is provided on its outer side with a pin 58 which fits within a suitable recess in the dog case to hold it in position. The gibs 49 may be adjusted inwardly of the dog case by means of set screws 51 and 52, and the gib 54 may be similarly adjusted by means of set screws 56 and 57. By the means shown, the wear of the guide bar 22 and the gibs may be compensated. Vertical movement of the dog case 23 on the dog case guide bar 22 is limited by means of a stop block 35 which is disposed to engage a pin 40 on the guide bar at the upper limit of travel of the dog case.

Figure 5:
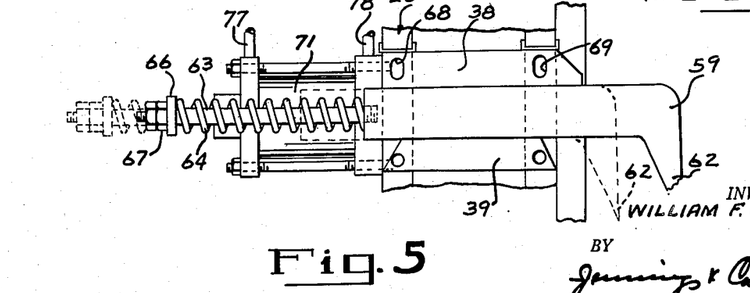
Fig. 5 is a detail view of the upper dog with the side plate of the dog case removed.
Figure 6:
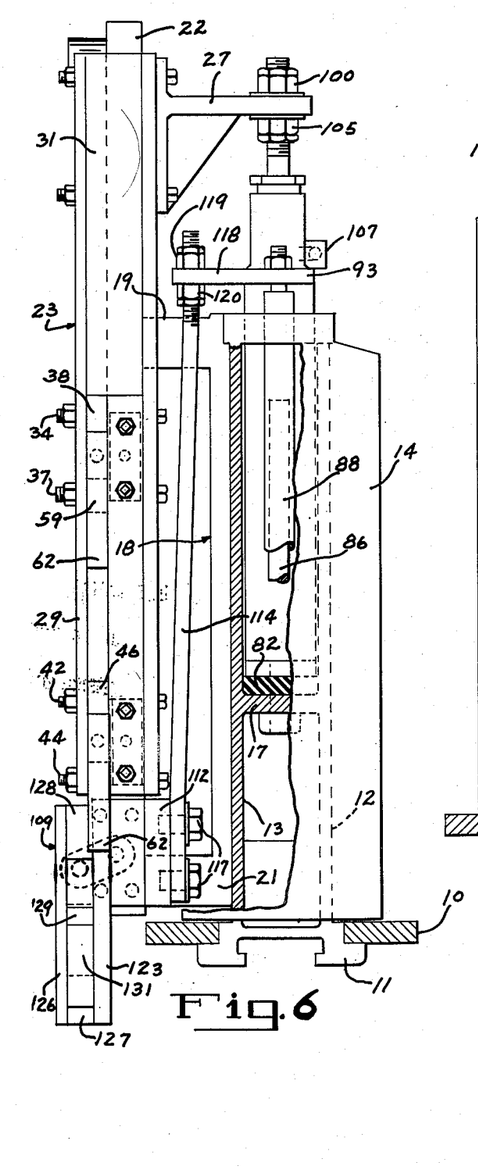
Fig. 6 is a front elevational view with parts broken away and in section.
Figure 7:
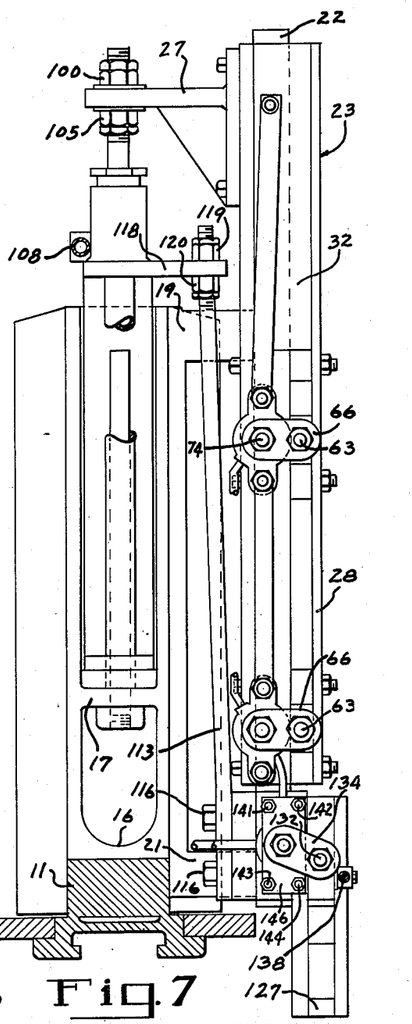
Fig. 7 is a rear elevational view with parts broken away and in section.
Figure 8:
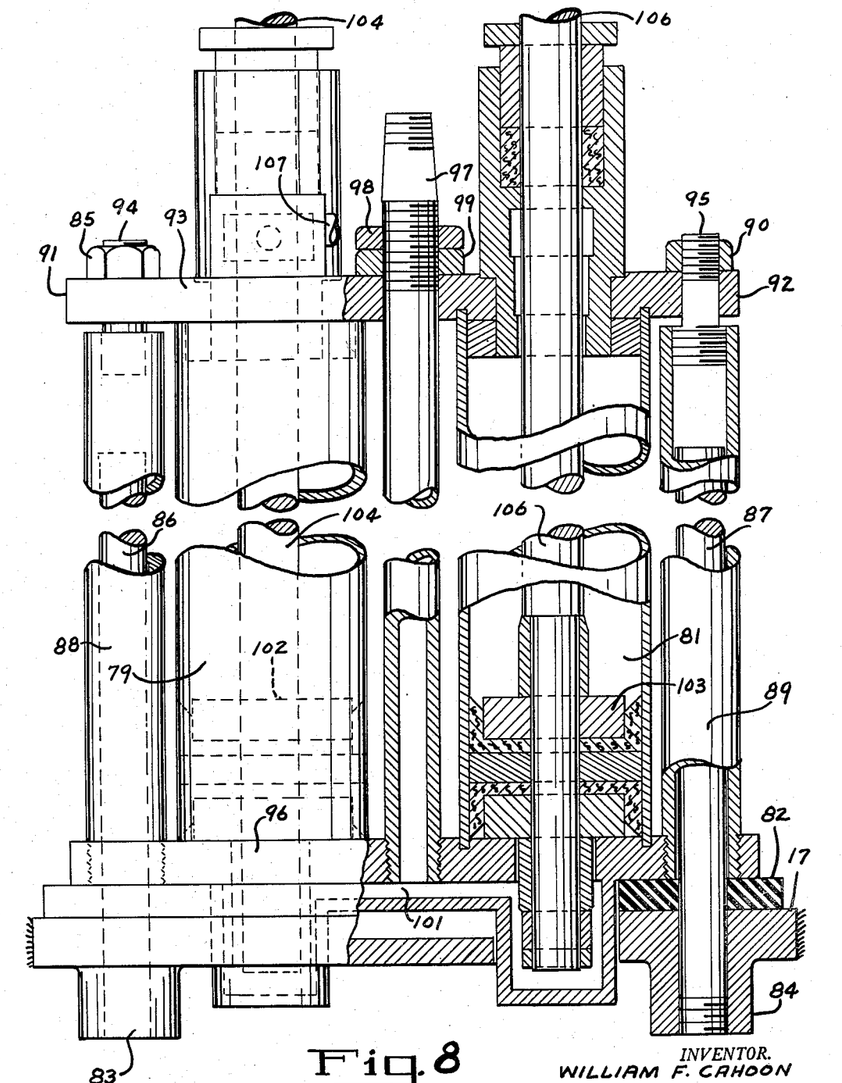
Fig. 8 is an enlarged detail sectional view of the dog operating cylinders.

Mounted between the dog bar guides 38 and 39 is an upper dog 59 and mounted between the intermediate dog bar guides 46 and 47 is an intermediate dog 61. Each of the dogs 59 and 61 is provided with a downturned dogging point 62. Joined to each of the dogs 59 and 61 is a rearwardly extending rod 63. A spring 64 surrounds the rod 63 and the rod extends rearwardly through a cross head 66 and is slidable with respect thereto. The cross head 66 bears against the spring 64 and nuts 67 on the outer end of the rod provide means to adjust the innermost position of the dog. As shown in Fig. 5 of the drawing, the dog bar guides are mounted in the dog case by means of bolts passing through slotted holes 68 and 69 thereby providing means for compensating for wear of the dogs and the guides.

The upper dog 59 and the intermediate dog 61 are moved inwardly and outwardly by means of air cylinders 71 and 72 which are similar in construction and operation and only one need be described. Mounted within the cylinder 71 is a piston 73 to which is connected a piston rod 74 having the cross head 66 mounted on the outer end thereof. Air is admitted to opposite sides of the piston 73 through conduits 77 and 78 in a manner well understood to cause the piston to move inwardly or outwardly. It will be seen that, with the construction described, in event a log or other piece of timber comes against the outer end of either of the dogs 59 or 61, it will be pushed inwardly, compressing the spring 64 against the cross head 66 and thereby preventing damage to the dog. It will also be seen that whatever the position of the dogs, except when pushed inwardly by timber, the tension on the springs surrounding the dog rods is the same.

The dog case 23 is raised and lowered on the dog case guide bar 22 by means of two air cylinders 79 and 81 which are movably mounted in the knee 11 between the side walls thereof on the base plate 17. A rubber cushion 82 is interposed between the lower ends of the cylinders and the base plate 17 to cushion movements of the cylinder with respect to the knee. Formed on the base plate 17 are threaded bosses 83 and 84 having vertically extending rods 86 and 87 secured therein. The rods 86 and 87 fit slidingly within sleeves 88 and 89 which are secured, at their upper ends, by means of studs 94 and 95 and nuts 85 and 90 to outwardly extending portions 91 and 92 of an upper cylinder head 93 which serves for both cylinders 79 and 81. The sleeves 88 and 89 are secured at their lower ends to the common lower head 96 of the two cylinders 79 and 81 and they thus hold the heads against separation. The upper and lower heads are also joined together by means of an air supply tube 97 which is screwed into the lower head 96 and is threaded exteriorly and clamped downwardly with respect to the upper head by means of nuts 98 and 99. The lower cylinder head 96 is formed with a passage 101 therein which leads to the lower ends of both the cylinders and connects with the air tube 97. Mounted within the cylinders 79 and 81 are pistons 102 and 103 with piston rods 104 and 106 connected thereto. The upper ends of the piston rods are connected to the bracket 27 by means of adjusting nuts 100 and 105. As before set forth, the bracket 27 is joined to the upper end of the dog case 23 and its position at rest with respect to the cylinders may thereby be adjusted. Air is supplied to the upper ends of the cylinders 79 and 81 by means of air conduits 107 and 108.

It will be seen that the mechanism just described provides a means whereby when air is admitted beneath the pistons 102 and 103, they move upwardly within the cylinders 79 and 81 to raise the dog case 23 and the dogs 59 and 61. When air is admitted to the upper ends of the cylinders above the pistons 102 and 103, the dog case 23 and dogs 59 and 61 are moved downwardly until they engage with a log or timber and are stopped thereby. Thereupon, the air acting against the upper heads of the cylinders raises the cylinders relative to the piston rods 104 and 106, the rods 86 and 87 acting as guides for the cylinders in their upward movement. This brings about upward movement of a lower dog now to be described.

Figures 9, 12:
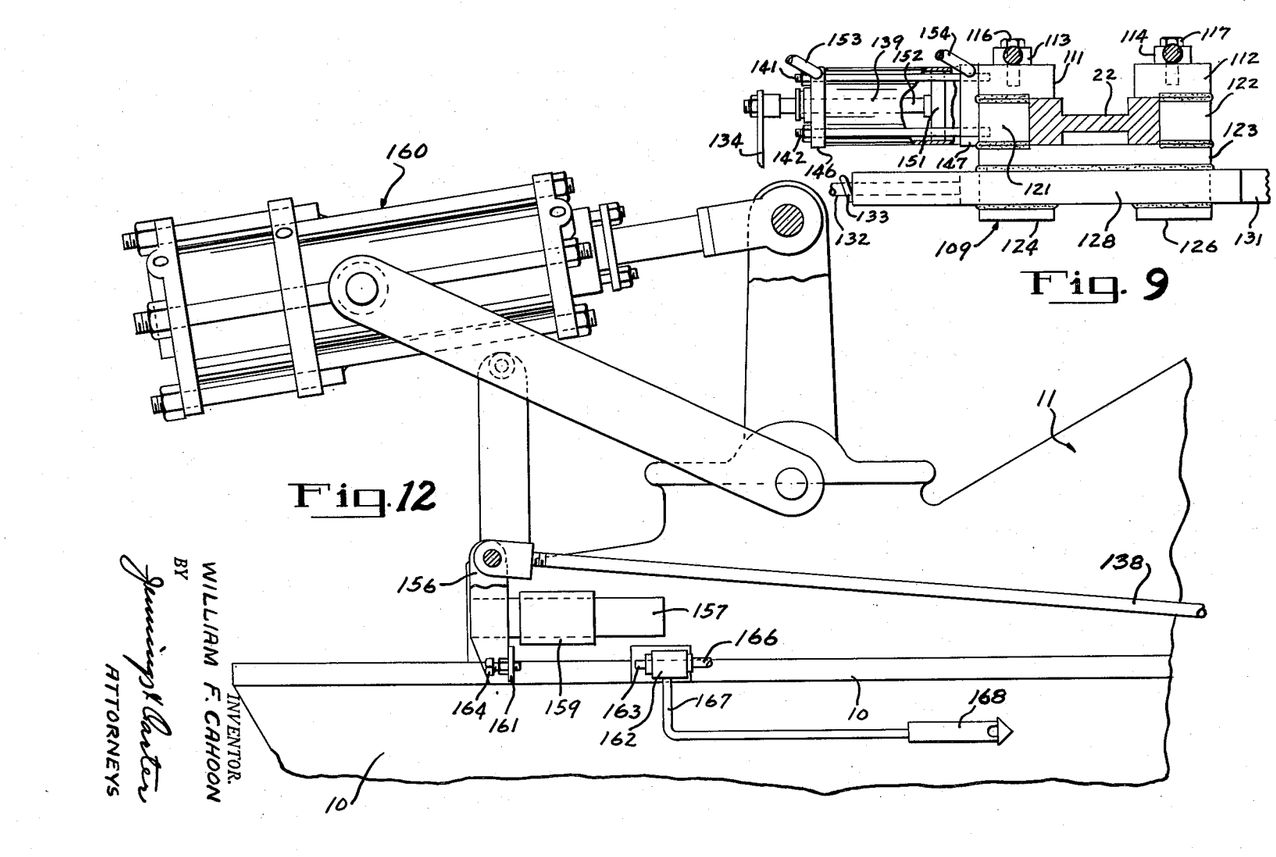
Fig. 9 is a sectional view taken along the line IX—IX of Fig. 1.
Fig. 12 is a side elevational view showing the rear portion of the knee and the safety operating mechanism for the lower dog.
Figure 10:
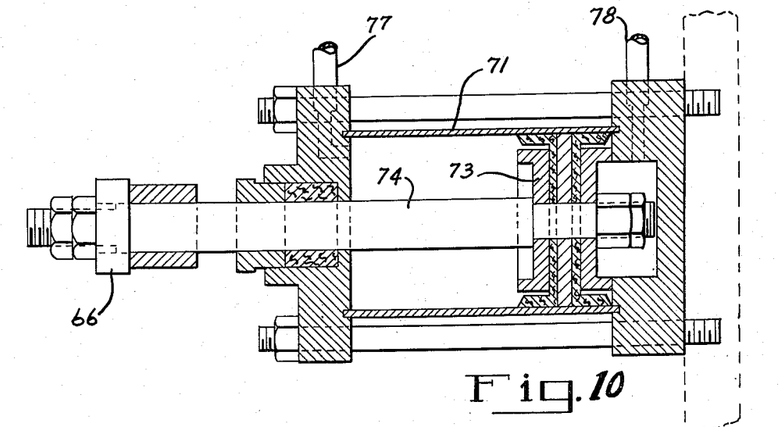
Fig. 10 is a detail enlarged sectional view of an air cylinder for operating one of the dogs.
Figure 11:
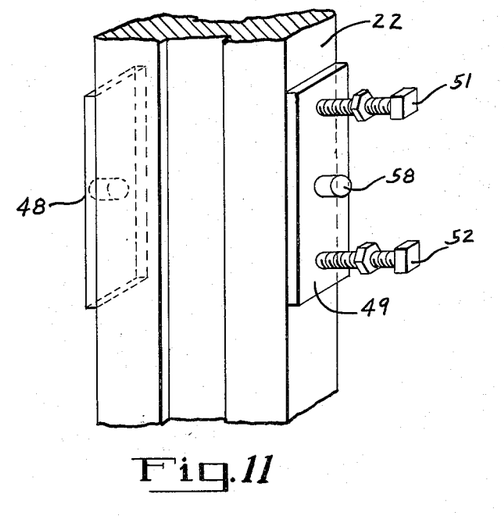
Fig. 11 is an enlarged detail perspective view showing the dog case guide bar and its adjustable gibs.

Mounted on, and movable vertically with respect to the dog case guide bar 22, is a lower dog case 109. The lower dog case is comprised of two spaced parallel steel plates 111 and 112 on the inner side, which are connected to bars 113 and 114 by means of studs 116 and 117, and which bars extend upwardly and are joined at their upper ends to an extension 118 on the upper cylinder head 93. The bars 113 and 114 are cylindrical at their upper ends and are threaded as shown to be joined to the extension 118 by means of adjusting nuts 119 and 120 whereby the initial position of the lower dog case with respect to the knee can be varied. As shown in Fig. 9 of the drawing, the bars 111 and 112 overlap the dog case guide bar 22. Joined to the bars 111 and 112 and bearing against the sides of the guide bar 22 are guide blocks, or gibs 121 and 122. Joined to the guide blocks 121 and 122 is an inner guide plate 123. Outer plates 124 and 126 are joined to the plate 123 by a lower spacer block 127, upper dog bar guide 128, and an intermediate dog bar guide 129.

Figure 1:
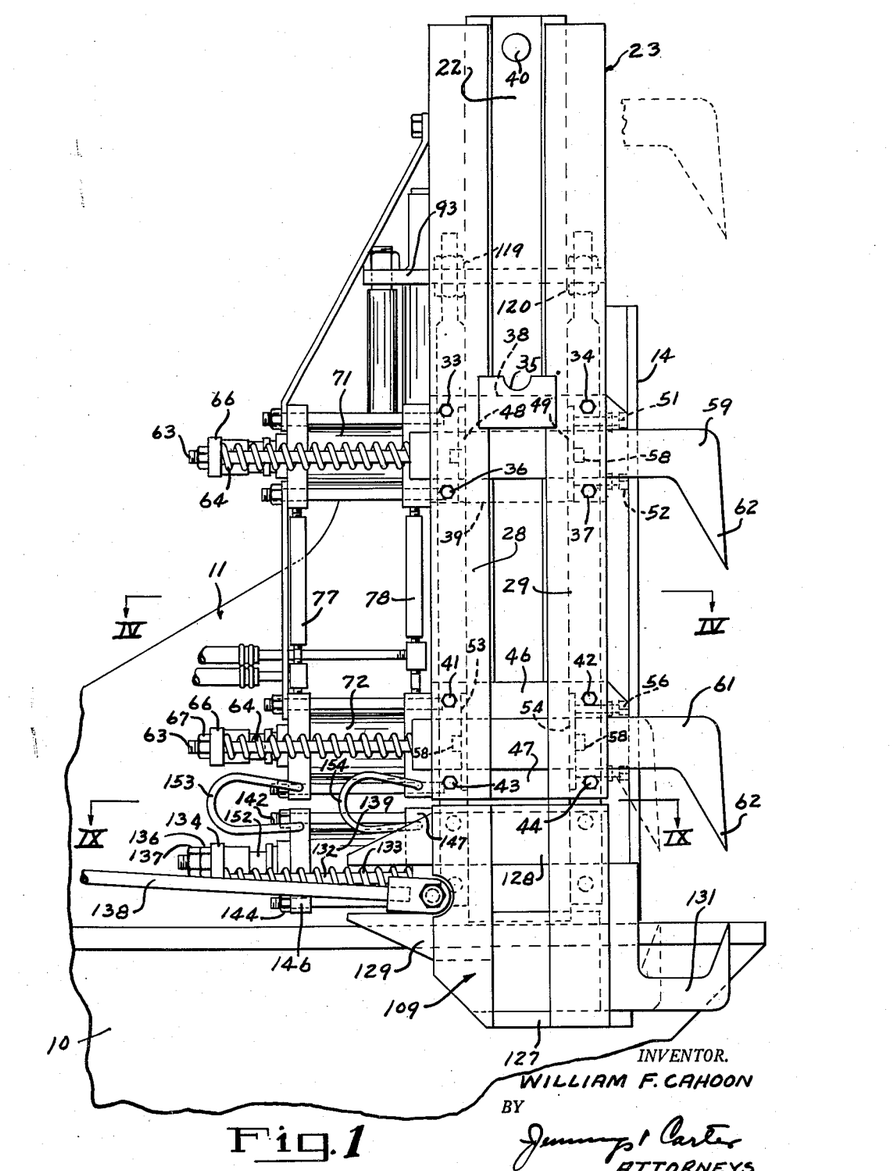
Fig. 1 is a side elevation showing the forward portion of the knee with the dogging apparatus.
Figure 2:
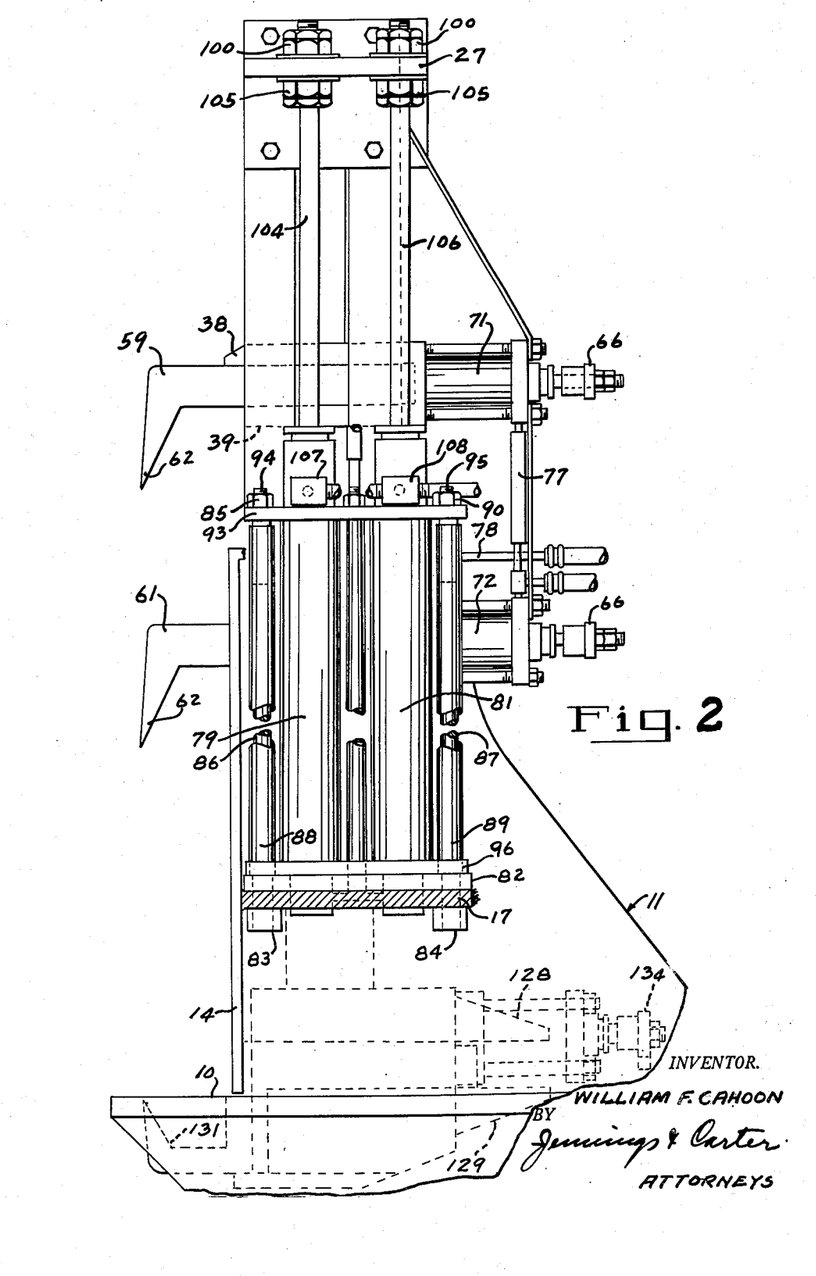
Fig. 2 is a sectional side elevation, taken from the opposite side from that shown in Fig. 1, with one side of the knee removed.
Figure 3:
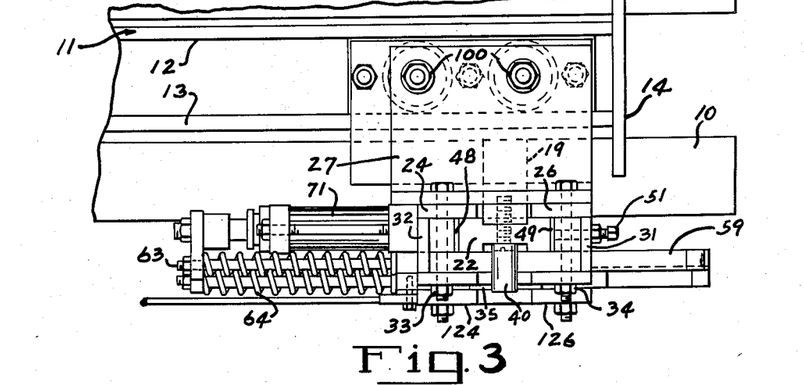
Fig. 3 is a plan view of the apparatus.

Mounted in the lower dog case just described is a lower dog 131, which, as shown in Fig. 1 is Z shaped in side elevation so that it bears on the lower spacer block 127 and lies between the intermediate guide 129 and upper guide 128. Secured to the rear end of the dog 131 is a rod 132 having a spring 133 surrounding it in the same manner as the dogs already described. The outer end of the rod 132 is threaded and passes through a cross head 134 having a slidable fit with respect thereto. Adjusting nuts 136 and 137 are screwed onto the outer ends of the rod 132 to adjust the initial position of the dog. Also secured to the rear end of the dog 131 is a rod 138 forming a part of a safety device to be described in detail hereinafter.

The lower dog 131 is moved inwardly and outwardly of the dog case 109 into dogging position by means of an air cylinder 139 which is mounted on the lower dog case. The cylinder 139 is secured to the dog case by means of studs 141, 142, 143 and 144 which passes from end to end of the cylinder through heads 146 and 147 and into the dog case, on the outside of the cylinders, and secure the heads 146 and 147 against separation. Mounted in the cylinder 139 is a piston 151 having a piston rod 152. Secured to the outer ends of the piston rod is a plate, or cross head 134 which is slidably connected to the dog rod 132 and bears against the spring 133. Air is admitted to opposite ends of the cylinder 139, as required, by means of air conduits 153 and 154 in a manner well understood. The conduits 153 and 154, as shown, are relatively long and flexible whereby upon separation of the upper and lower dog cases, the air connections are not broken.

Referring now to Fig. 12, together with Fig. 1, I show in detail the construction and operation of the lower dog safety limit device. The rod 138 is connected to a movable cross head 156 which has connected thereto and extending forwardly therefrom a rectangular bar 157. The bar 157 fits slidingly within a guide 159 secured to the side of the knee 11 at the rear thereof. At 160 is indicated a tapering mechanism mounted on the knee 11, which forms no part of my present invention. Accordingly it is not described in detail. Extending outwardly from the cross head 156 is a bracket 161 which moves forwardly and rearwardly with the cross head. Mounted on the head block is a valve case 162 having a plunger 163 extending rearwardly therefrom in the path of movement of the bracket 161. A set screw 164 extends through the bracket 161 to engage the stem 163. Air is admitted to the housing 162 by means of a conduit 166 and, upon opening of the valve by means of the valve stem 163 escapes through a conduit 167. When this occurs, a whistle 168, connected to the conduit 167 is blown to warn the operator that the lower dog has reached the safe outward limit of its travel. Also, when this occurs, the bracket 161 engages the housing 162 and further forward movement of the lower dog is prevented. While I have shown an air operated cylinder and a whistle as the warning signal it will be obvious however that other well known forms of warning signal may be employed.

From the foregoing description, the operation of my improved dogging apparatus will be readily understood. With a piece of timber placed against the face plate 14 of the knee between the lower dog 131 and one of the dogs 59 or 61, as the case may be, depending upon the thickness of the timber, the dogs are moved forwardly, if necessary, to dogging position whereby they can engage the timber. With the dogs in position to engage the timber, air is admitted to the upper ends of the cylinders 79 and 81 through the conduits 107 and 108 to force the pistons downwardly carrying with them the bracket 27 and dog case 23 to lower the dogs 59 and 61. As soon as the dog 59 or 61, as the case may be, engages the timber, its further downward movement is arrested and the action of the air to the upper ends of the cylinders 79 and 81, raises the cylinders off their support carrying with them the extensions 118, the lower dog case lift bars 113 and 114 and the lower dog case 109, thereby to raise the lower dog 131 to engage the lower side of the timber. When it is desired to release the timber, or move the dogs to another position, air is admitted to the lower ends of the cylinders 79 and 81 beneath the pistons 102 and 103 whereupon the pistons move upwardly, taking the bracket 27 and dog case 23, and disengaging the upper dogs from the timber. At the same time, the cylinders 79 and 81 are lowered by raising the pressure against the lower cylinder head, to lower the lower dog case 109 and release the lower dog 131 from the timber.

While I have shown the dog cases 23 and 109 as being raised and lowered by means of two air cylinders 79 and 81, this is for convenience only and it will be obvious that more, or fewer, cylinders may be employed.

From the foregoing, it will be seen that with the cylinders 79 and 81 located between the side walls of the knee, and the dog cases and dogs supported from the cylinders, that all the weight of the apparatus is transferred to the head block centrally of the knee. The only weight carried by the knee and laterally thereof is the weight of the dog case guide bar 22. The positioning of the upper and lower dog cases outside the knee renders them readily accessible for adjustment and maintenance which is a very important item in the operation of a sawmill. It will thus be seen that I have provided improved dogging apparatus which is simple and sturdy of construction, and which is readily adjusted and maintained.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What is claimed is:

1. In timber dogging apparatus including a knee having spaced side walls, a pneumatic cylinder having upper and lower heads and disposed between the sides of the knee, a support for the cylinder between the sides, a vertically disposed dog case guide bar supported by and extending alongside outwardly of the knee, a dog case mounted to move on the guide bar, a piston in the cylinder, a connection between the piston and the dog case, a lower dog case mounted on the lower end of the guide bar to move thereon, a connection between the cylinder and the lower dog case, guide means for the cylinder between the walls of the knees comprising guide rods secured to and extending upwardly from the cylinder support and sleeves slidingly fitting over said rods and secured to said upper and lower heads, and upper and lower dogs extending outwardly respectively from the upper dog case and the lower dog case.

2. In timber dogging apparatus including a knee having spaced side walls, a vertically disposed dog case guide bar supported by and positioned outwardly of the knee, a double acting pneumatic cylinder disposed between the side walls of the knee, a piston in said cylinder, a support for the cylinder spanning the space between the side walls and joined thereto, a resilient cushion between the lower end of the cylinder and the support, guide rods secured to and extending upwardly from the cylinder support, upper and lower heads for the cylinder, outwardly extending portions on each of said heads, sleeves slidingly fitting over the guide rods and connecting the outwardly extending portions of said upper head to the outwardly extending portions of said lower head, an upper dog case supported from and movable with the piston, and a lower dog case supported by and movable with the cylinder.

3. Apparatus as set forth in claim 2 in which the sleeves are secured to said upper and lower cylinder heads and serve to retain the cylinder heads in place.

4. In timber dogging apparatus including a knee having spaced side walls, a cylinder support extending between the side walls, spaced rods secured to the support and extending upwardly therefrom, a pneumatic cylinder mounted on the support and having opposed heads connected by means including tubes which fit slidingly over the rods, a resilient cushion between the cylinder and the cylinder support, a piston in the cylinder, means to admit air under pressure selectively to opposite ends of the cylinder, an upper and a lower dog case mounted alongside the knee, means for supporting the upper dog case from the piston, means for supporting the lower dog case from the cylinder, and upper and lower dogs respectively mounted in the upper and lower dog cases and extending forwardly therefrom.

5. In timber dogging apparatus including a knee having spaced sidewalls, a vertically disposed dog case guide bar supported from the knee and positioned outwardly of the knee in spaced relation thereto, a dog case mounted on the guide bar and movable vertically with respect thereto, a pneumatic cylinder having a piston therein mounted between the side walls of the knee, a supporting connection between the piston and the dog case, pins mounted on opposite sides of said guide bar and extending outwardly therefrom, movable gibs mounted in the dog case and bearing against the sides of the guide bar, there being an opening in each gib of a size to receive one of said pins, and set screws bearing against the gibs to compensate for wear between the gibs and the guide bar.

6. In timber dogging apparatus including a knee having spaced side walls, a cylinder support extending between the side walls, spaced rods secured in the support and extending upwardly therefrom, a pair of pneumatic cylinders mounted on the support and having opposed common heads connected by means including tubes which fit slidingly over the rods, a resilient cushion between the cylinders and the cylinder support, pistons in the cylinders, means to admit air under pressure selectively to opposite ends of the cylinders, an upper and a lower dog case mounted alongside the knee, means for supporting the upper dog case from the pistons, means for supporting the lower dog case from the cylinders, and upper and lower dogs respectively mouted in the upper and lower dog cases and extending forwardly therefrom.

7. In timber dogging apparatus including a knee having spaced side walls, a cylinder support extending between the side walls, spaced rods secured in the support and extending upwardly therefrom, a pair of pneumatic cylinders mounted on the support and having opposed common heads connected by means including tubes which fit slidingly over the rods, a resilient cushion between the cylinders and the cylinder support, pistons in the cylinders, means to admit air under pressure selectively to opposite ends of the cylinders, an upper and a lower dog case mounted alongside the knee, guide means for both dog cases carried by the knee, a bracket mounted on the upper ends of the pistons and extending outwardly of the knee where it is connected to the upper dog case, an extension on the heads of the cylinders and extending outwardly from the knee and from which the lower dog case is supported, and upper and lower dogs respectively carried by the upper and lower dog cases and extending forwardly therefrom.

8. In timber dogging apparatus, a hollow knee, a pair of pneumatic cylinders mounted in the knee, common upper and lower heads for the cylinders, the lower head having an air passage therein leading to both cylinders, an air supply tube extending through the upper head between the cylinders and connected to the lower head to supply air to said passage, threads on the upper end of the tube, and nuts on the threaded end engaging the upper cylinder head to hold the heads in place.

9. In timber dogging apparatus, a hollow knee, a pair of pneumatic cylinders mounted in the knee, common upper and lower heads for the cylinders, the lower head having an air passage therein leading to both cylinders, an air supply tube extending through the upper head between the cylinders and connected to the lower head to supply air to said passage, threads on the upper end of the tube, nuts on the threaded end engaging the upper cylinder head to hold the heads in place, a plurality of sleeves connecting the upper and lower heads and extending through the lower head, a support for the cylinders in the knee, and guide rods extending upwardly from the support into the sleeves.

10. In timber dogging apparatus, a hollow knee, a pair of pneumatic cylinders mounted in the knee, common upper and lower heads for the cylinders, the lower head having an air passage therein leading to both cylinders, an air supply tube extending through the upper head between the cylinders and connected to the lower head to supply air to said passage, threads on the upper end of the tube, and nuts on the threaded end engaging the upper cylinder head to hold the heads in place, a plurality of sleeves connecting the upper and lower heads and extending through the lower head, a support for the cylinders in the knee, guide rods extending upwardly from the support into the sleeves, and resilient cushioning means surrounding the guide rods and interposed between the cylinders and the support.

WILLIAM F. CAHOON.

REFERENCES CITED

The following references are of record in the file of this patent:

UNITED STATES PATENTS

| Number | Name | Date |
| --- | --- | --- |
| 1,009,376 | Bayles | Nov. 21, 1911 |
| 1,637,907 | Langill et al. | Aug. 2, 1927 |
| 1,772,052 | Martin | Aug. 5, 1930 |
| 1,810,752 | Brophy | June 16, 1931 |
| 1,839,713 | Tanner | Jan. 5, 1932 |
| 1,847,657 | Langill et al. | Mar. 1, 1932 |
| 1,944,285 | Haase | Jan. 23, 1934 |
| 2,318,163 | Kahr | May 4, 1943 |